April 10, 1962  N. L. DE LEAR  3,028,911
DISPOSABLE FILTER ELEMENTS AND FORMING
METHODS THEREFOR
Filed Dec. 12, 1957  2 Sheets-Sheet 1

INVENTOR.
NICHOLAS L. DE LEAR
BY
Kenyon & Kenyon
ATTORNEYS

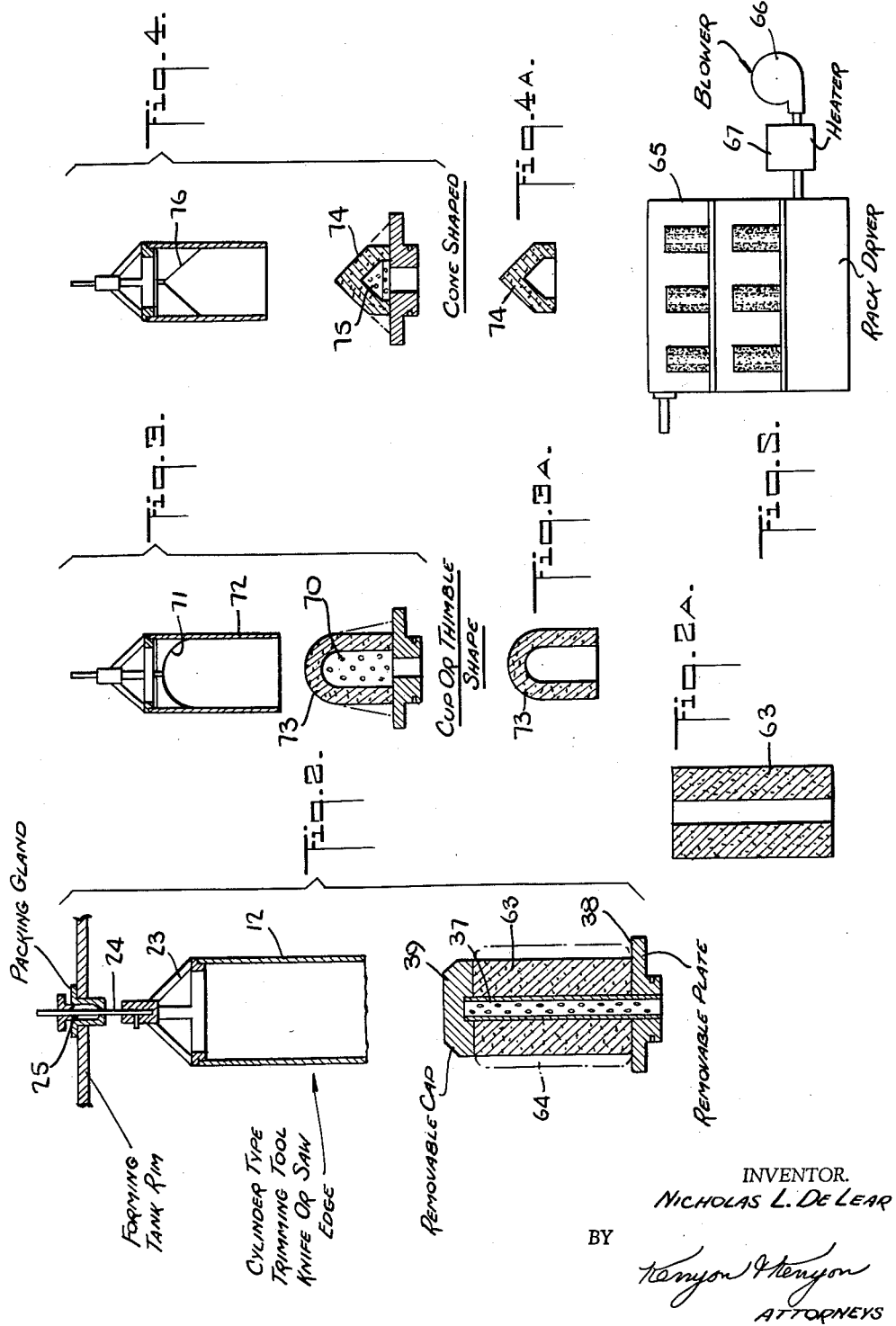

ced Apr. 10, 1962

United States Patent Office 3,028,911
Patented Apr. 10, 1962

3,028,911
DISPOSABLE FILTER ELEMENTS AND FORMING
METHODS THEREFOR
Nicholas L. De Lear, 250 Dewey Place, Teaneck, N.J.
Filed Dec. 12, 1957, Ser. No. 702,477
2 Claims. (Cl. 162—383)

The present invention relates generally to filter elements, and more particularly to disposable filter elements of the graded density type and to improved techniques for fabricating such elements.

For the purpose of filtering liquids and gases that are caused to flow radially inwardly through a filter element under differential pressure, it is known, in the interests of maximum filtering, to make the fibrous structure of the elements of graded porosity whereby the sizes of the pores increase progressively toward the outer surface. By reason of such gradations in porosity, the foreign particles to be filtered out penetrate to varying depths in accordance with their size and are thereby trapped.

It has heretofore been the practice to produce the desired gradations in porosity by accreting resin-impregnated fiber from a liquid dispersion thereof, this being accomplished by means of a vacuum or gravity technique. Thus, in the patent to Anderson No. 2,539,767, issued January 30, 1951, there is disclosed a method for forming a filter element of the graded density type by causing the liquid suspension of the fibers to accrete on a perforated former through the application of suction imposed upon the interior of such formers. By controlling the degree of vacuum and the length of time over which the vacuum is effective, a filter carcass may be produced having a graded porosity.

The principal drawback to the vacuum method described in the above-noted patent lies in the fact that the range of control is distinctly limited, for the maximum degree of suction is with reference to atmospheric pressure. As a result, the filter produced by the vacuum method is poorly felted and is lacking in proper rigidity and structural strength.

In view of the foregoing, it is the principal object of the present invention to provide a pressure technique for forming filters of the graded density type, wherein the pressure applied to effect a felting action on the former is substantially in excess of atmospheric pressure. A significant advantage of the invention resides in the fact that the range of control in accreting the fiber on the former is substantially enlarged and the resultant filter has a greater capacity for dirt accumulation than prior devices.

More particularly it is an object of the invention to provide an improved technique for producing fibrous filter structures under pressure on a foraminated former assembly, which technique is efficient and reliable and is consistent in its results. A filter cartridge fabricated in accordance with the invention possesses uniform filtration characteristics and may be economically manufactured.

Briefly stated, these objects are attained in a system wherein the foraminated former is immersed in a liquid suspension of fibers contained in a pressurized forming tank, whereby the liquid is caused to flow through the former by reason of the differential pressure between the internal tank pressure and the atmosphere. Thus, as the liquid flows, fibers are accreted on the former to produce a wall thereon whose density is progressively lessened as the wall becomes thicker.

For a better understanding of the invention as well as other objects and further features thereof, reference is had to the following detailed description to be read in conjunction with the accompanying drawings, wherein like components in the various views are identified by like reference numerals.

In the drawings:

FIG. 2 is a vertical section taken through the trimming tool and former assembly in the system.

FIG. 2A is a vertical section illustrating the shape of the cylindrical filter element after trimming.

FIG. 3 shows in vertical section a modified form of trimming tool and former assembly to produce a thimble-shaped filter.

FIG. 3A is a vertical section illustrating the thimble-shaped filter element after trimming.

FIG. 4 is a vertical section illustrating another modified form of trimming tool and former assembly to produce a cone-shaped filter element.

FIG. 4A is a vertical section of the cone-shaped filter element after trimming.

FIG. 6 is an end view showing final trimming of the filter element using a centerless grinder.

Figure 1:
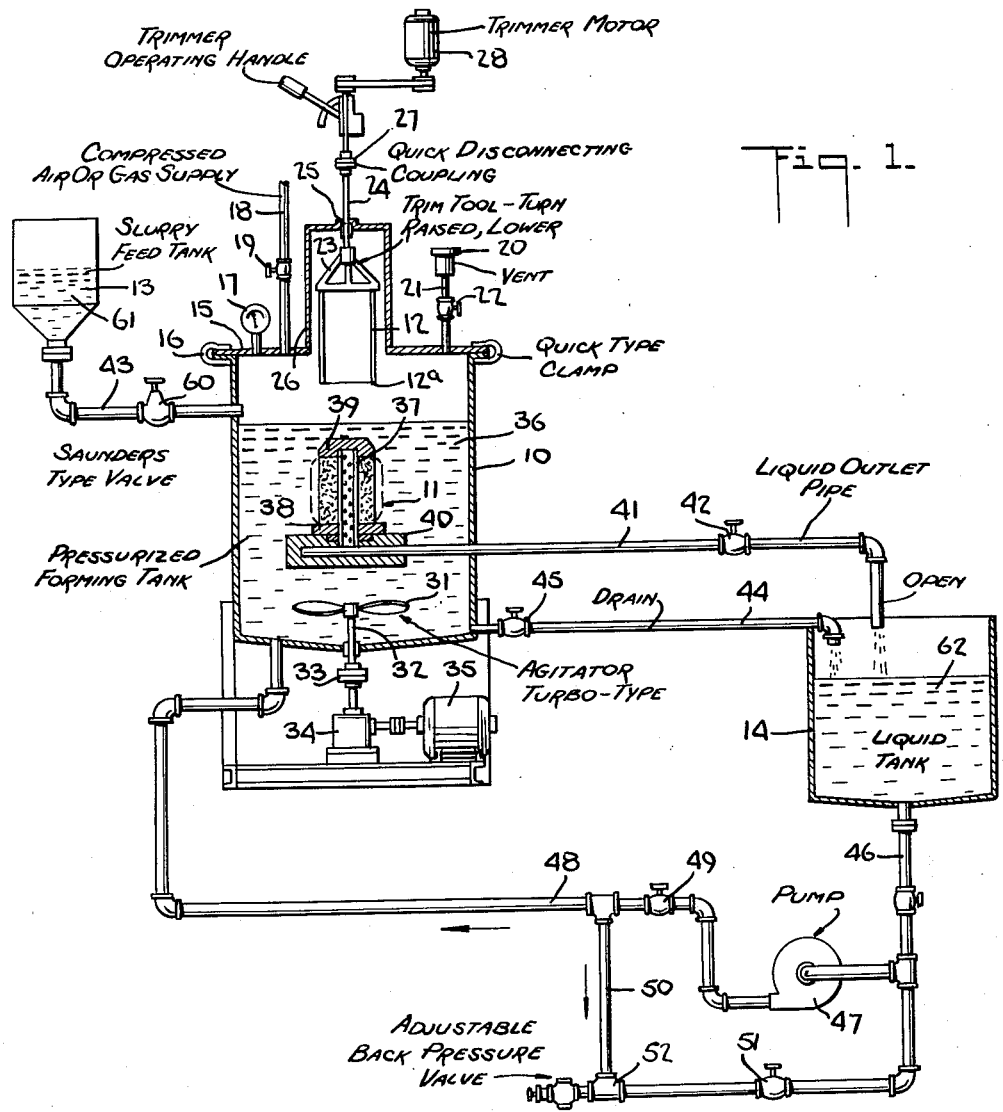
FIG. 1 is a schematic diagram of a system for carrying out a filter-forming method in accordance with the invention.

Referring now to the drawings and more particularly to FIG. 1, the principal components of a system in accordance with the invention for forming filter elements of the graded density type are a pressurized forming tank 10, a former assembly, generally designated by numeral 11, a retractable trimming tool 12 adapted to coact with the former assembly, a slurry feed tank 13 for supplying a fiber suspension into the forming tank and a liquid reservoir 14 coupled both to the former assembly and to the body of the forming tank.

The forming tank 10 is provided with a removable cover 15, which is attached to the tank by means of suitable clamps 16 to seal the tank hermetically during forming operations. Coupled to the cover 15 is a pressure gauge 17 for reading the pressure within the forming tank, and a pipe 18 leading to a compressor for feeding compressed air or gas into the tank, a control valve 19 being interposed therein.

Pressure relief to the atmosphere is effected by means of a vent 20 coupled to the cover 15 by a pipe 21 having a valve 22 therein which, when opened, releases the pressure within the forming tanks.

The trimming tool 12 is in the form of a tubular element whose lower end 12a has a knife or saw-tooth edge, the upper end of the tool being supported by a frame 23 attached to a rotary shaft 24. Shaft 24 extends vertically through a packing gland 25 on the roof of a housing 26 mounted on the cover 15, the trimming tool being retracted in the housing when not in use.

Shaft 24 is coupled through a disengaging clutch 27 to the trimmer motor 28 which causes rotation of the trimming tool at a rapid rate. A retracting mechanism 29, provided with a handle 30, is adapted to bring down the trimming tool 12 over the former assembly 11 upon completion of the forming operation so as to trim excess material from the surface of the filter carcass.

Disposed within the forming tank 10 and adjacent the bottom wall thereof is an agitator 31, preferably of the turbo type, supported on the end of a vertical shaft 32 which extends from the tank through a packing gland 33 and is coupled by means of a gear box 34 to a drive motor 35. The agitator acts to keep the aqueous dispersion 36 of resin-impregnated fibers in the forming tank thoroughly agitated and thereby ensure a uniform consistency throughout the entire mass.

The former assembly 11 is constituted by a foraminated tube 37 having a base plate 38 and a cap 39 removably attached to the lower and upper ends thereof, respectively. Tube 37 serves as a core for building up a wet carcass of fibrous material between the cap and base plate. In practice the tube may be slightly tapered lengthwise to facilitate removal therefrom from the carcass. The base plate 38 of the former assembly rests on a hollow block 40 whereby the former tube 37 communicates with the interior of the block. The block is coupled to reservoir 14 by means of a liquid outlet pipe 41 which is extended to and discharges into the upper end of the reservoir, a control valve 42 being interposed in the outlet pipe.

The slurry feed tank 13 is connected to the upper portion of the forming tank 10 through a pipe 43 having a valve 60 therein. A drain pipe 44 connected to the lower portion of the forming tank 10 extends to and discharges into the upper end of the reservoir 14, a valve 45 being placed in the drain pipe. The bottom of the reservoir 14 is coupled serially through a pipe 46, a pump 47 and a pipe 48 to the bottom of the forming tank 10, a valve 49 being placed in pipe 48. A back-pressure pipe 50 is connected across pump 47, a control valve 51 and a back-pressure valve 52 being inserted therein.

The fibrous material constituting the filter element is preferably a mixture of wool and cellulose; however other types of fibers may be used. Filter elements may be fabricated entirely of wool, but because of the free properties of wool, the resultant element would be too coarse or porous to remove minute particles in the range of 30 microns or less. Hence to trap such smaller particles it is necessary to combine the wool fibers with a fiber of smaller diameter in the order of 10 microns or less.

Various cellulosic fibers can be mixed with wool fibers in proportions up to 35 to 50% by weight of the total mix. The size and character of the fibers may also vary depending on the specific qualities desired. Among the other fibers which are usable are mineral wool, asbestos, cotton, jute, sulphite pulp, manila pulp and the like.

The first step in the process is that of fiber mixing and blending by paper making techniques whereby the material from which the filter elements are to be made is given its proper consistency and during which the desired ingredients are properly compounded. The time of beating is controlled in accordance with the fibers used and the desired density of the filter element. The different types of fibers should be beaten separately at first, then mixed by adding finer fibers. After preparation of the mixed stock, a quantity thereof is mixed with a dispersion of resin particles of resin forming ingredients, either in the form of alcohol or a water dispersion. Various resins including the phenols, urea and melamine types of thermosetting resins may be employed as well as diverse forms of thermoplastic resins.

At the start of operation, valve 60 in the slurry feed line is opened allowing flow from the slurry tank 13 to the forming tank 10, the fiber slurry 61 containing approximately 5% of fibers in water. A measured quantity of slurry is then mixed with an aqueous dispersion 62 of resin particles or resin-forming ingredients taken from the reservoir 14 and pumped into the tank 10 by pump 47 to form the suspension 36. The aqueous dispersion of the resin-impregnated fibers has now been reduced to about .3 to .4 of 1% of fibers. The slurry feed valve 60 is then closed.

The former assembly 11 is installed in the forming tank 10 by immersing it below the level of the suspension 36. The suspension level is above that of the former assembly 11 but below the top of the forming tank. After the former assembly is set in place, the tank cover 15 is locked into position by clamp 16. The vent 20, the pressure supply pipe 18, the trimming tool 12 and the pressure gauge 17 are connected to the cover before closing the tank. The liquid outlet valve 42 and the drain valve 45 as well as the vent valve 22 are shut at the outset of the operation. Also closed are valves 49 and 51. Thus the forming tank is completely sealed from the remainder of the system.

In order to pressurize the forming tank, valve 19 is opened to admit compressed air or gas until the desired internal pressure is reached as indicated on the pressure gauge 17. The normal range of pressure will lie between 2 p.s.i.g. to 250 p.s.i.g., but higher pressure may also be used if required by the nature of the fibers and resin and the desired density.

The next step is to open the liquid outlet valve 42, thereby forcing the liquid in the suspension, under the internal pressure of the tank, to flow through the foraminated tube of the former assembly into the liquid reservoir 14. The liquid is subjected to a pressure representing the difference between the internal tank pressure and atmospheric pressure. As the liquid flows through the former tube, fibers in the suspension will at the same time deposit on the outer surface of the tube. The flow velocity of liquid through the former will decrease as the diameter of the fibrous filter element formed thereon increases.

As the velocity decreases, the density of the fibers deposited will diminish, hence while the filter carcass is initially relatively dense, it becomes progressively less so as the thickness of the wall about the former increases.

Thus a point is reached in the forming process where the available pressure differential is too low to overcome resistance of the element from the outer to the inner surface. As pointed out previously, the pressurized forming tank makes possible considerably greater differential pressures than that produced in existing gravity or vacuum forming techniques. The accretion of fibers builds up a carcass 63 which, as best seen in FIG. 3, is roughly cylindrical in shape. The outer periphery of the carcass, as represented by dotted lines 64 is composed of loosely held fibers in a somewhat irregular contour.

At the end of the element forming cycle whose duration can vary from a few seconds to several minutes depending on size and character of the fibers as well as the particular qualities desired, compressed air or gas supply valve 19 is closed and vent valve 22 is opened to vent to atmosphere. Trimming tool 12 is then lowered by operating the handle 30 and the trimming motor 28 started. As the trimming tool descends over the roughly formed element, it trims it to the desired size which of course corresponds to the inner diameter of the tool.

After completion of trimming, the tool 12 is raised to permit removal of the filter element 63, the clamps 16 are unlatched and the cover 15 removed from the forming tank. The aqueous dispersion of resin impregnated fibers are drained from the forming tank by opening drain valve 45, the dispersion thus flowing into reservoir 14 where it mixes with the aqueous resin dispersion 62.

Figure 5:
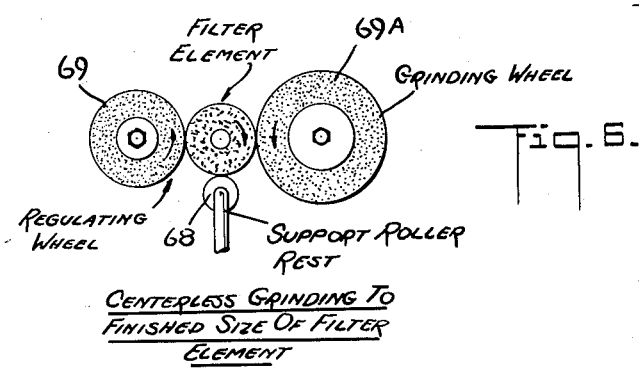
FIG. 5 is a vertical section illustrating a rack dryer with a heater and blower used for drying, presetting and final curing of the filter element.

The filter element 63 is then removed from the forming tanks and dried, pre-set and cured in a rack dryer chamber 65, as shown in FIG. 5. Heated air is blown into the chamber 65 by means of a suitable blower 66 and heater 67, the time and temperature being so controlled that the water is removed from the carcass. After adequate drying, the filter carcasses are subjected to a higher temperature to set the resin, and thereafter the carcasses are subjected to a still higher temperature to be cured.

At the conclusion of the curing step, the carcasses are oversize and must be finished to the desired filter dimensions. Furthermore, the outer surfaces are fairly rough and irregular and may have a surface film of resin which would tend to clog the filter. Finishing is preferably effected, as shown in FIG. 6, by a centerless grinding mechanism including a roller support 68 which maintains the filter between a regulating wheel 69 and a grinding wheel 69A. The ends of the filter may also be cut or ground to size.

Upon completion of the forming cycle, the contents of the reservoir 14 are pumped back into the forming tank 10, slurry is added thereto to obtain the desired consistency, as described previously, and the entire cycle repeated. The valves 49 and 51 are used to control the direction of flow of liquid from reservoir 14 to forming tank 10. The forming tank may also be pressurized by means of pump 47, rather than by a compressed air supply. This is accomplished by circulating the liquid 62 from the reservoir at a desired pressure maintained by setting the back pressure valve 52.

The invention is by no means limited to the fabrication of cylindrical filter elements and other shapes may also be manufactured. Thus, as shown in FIG. 3, the former assembly includes a thimble-shaped former 70 and a complementary dome 71 in the trimming tool 72 whereby the resultant filter 73 has a cup shape. A cone shape filter 74 is produced in the arrangement shown in FIG. 4 wherein the former 75 is cone shaped and the trimming tool contains a complementary cone 76. The process is otherwise the same as in FIG. 1.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A system for producing fibrous filter elements of the graded porosity type comprising a forming tank, a removable cover for said tank hermetically to seal same, slurry feed means for supplying a fibrous dispersion into said tank, a reservoir for feeding a resinous solution into said tank to mix with said dispersion to produce a suspension therein, a foraminated former assembly disposable in said tank and including a former element, outlet means coupling said assembly for discharge into said reservoir means, means coupled to said cover for feeding pressurized gas into said tank to subject said suspension to pressure above atmospheric level, gauge means coupled to said cover to indicate tank pressure and to maintain said predetermined pressure, controllable vent means coupled to said tank, and a valve in said outlet means which when opened produces a differential pressure in said tank causing said liquid to flow through said former element into said reservoir whereby said fibers deposit on the surface thereof with a density which varies progressively as the thickness of deposit increases to form a filter carcass, and a retractable trimming tool mounted within a housing attched to said cover and adapted to coact with said assembly to trim surplus fibers from said carcass.

2. A system as set forth in claim 1, further including a turbo element disposed in said tank to agitate the suspension therein.

References Cited in the file of this patent
UNITED STATES PATENTS

| | | |
|---|---|---|
| 190,654 | Wheeler | May 8, 1877 |
| 804,432 | Rivers | Nov. 14, 1905 |
| 1,463,575 | Cooper | July 31, 1923 |
| 1,536,566 | Cooper | May 5, 1925 |
| 1,551,257 | Little | Aug. 25, 1925 |
| 2,539,767 | Anderson | Jan. 30, 1951 |